US009996442B2

(12) United States Patent
France (10) Patent No.: US 9,996,442 B2
(45) Date of Patent: Jun. 12, 2018

(54) CLOUD COMPUTING BENCHMARKING (71) Applicant: Krystallize Technologies, Inc., Fulshear, TX (US)

(72) Inventor: Clinton France, Fulshear, TX (US)

(73) Assignee: Krystallize Technologies, Inc., Fulshear, TX (US)

( * ) Notice: Subject to any disclaimer, the term of this patent is extended or adjusted under 35 U.S.C. 154(b) by 0 days. days.

(21) Appl. No.: 14/225,424

(22) Filed: Mar. 25, 2014

(65) Prior Publication Data
US 2015/0278066 A1 Oct. 1, 2015

(51) Int. Cl.
*G06F 11/34* (2006.01)

(52) U.S. Cl.
CPC ...... *G06F 11/3428* (2013.01); *G06F 11/3452* (2013.01)

(58) Field of Classification Search
CPC ............ G06F 11/3006; G06F 11/301; G06F 11/3082; G06F 11/3089; G06F 11/3476; G06F 11/3495; G06F 11/3428; G06F 11/34; G06F 11/323; G06F 11/3419; G06F 11/07; G06F 11/3644; G06F 9/5072; G06F 9/4856; G06F 9/44; G06F 17/303; G06F 11/3051; G06F 11/3093; G06F 11/3055; G06F 11/3404; G06F 11/3466; G06F 9/52; G06F 9/526; G06F 11/348; G06F 2201/86; G06F 2201/865; G06F 2201/88; G06F 11/3409; G06F 11/3096; G06F 11/3433; G06F 11/3636; G06F 11/3447; G06F 11/3452; G06F 11/3604; G06F 2201/81;
(Continued)

(56) References Cited

U.S. PATENT DOCUMENTS 5,105,372 A * 4/1992 Provost et al. ............... 702/185
6,021,437 A * 2/2000 Chen ................... G06F 11/0709
709/202

(Continued)

OTHER PUBLICATIONS

Krishnan et al., "VM power metering: feasibility and challenges", Dec. 2010, ACM Sigmetrics, vol. 38 Issue 3.*

(Continued)

*Primary Examiner* — Vivek Srivastava
*Assistant Examiner* — Todd L Barker
(74) *Attorney, Agent, or Firm* — Han Santos, PLLC (57) ABSTRACT

Cloud computing benchmarking is performed wherein the resource usage of a measuring benchmarking application is compensated for as to not impact measurement. The measurements are of a cloud instance's benchmarking indicia which may include performance, functions and characteristics of the cloud instance. The benchmarking indicia use scalable measures as to allow the use of arithmetic operations such as those used in statistical functions. The benchmarking application is dispatched along with a configuration file and is controlled from a central controller to specified cloud instances. The dispatched benchmarking application takes measurements of the cloud instance based on the configuration file. The benchmarking application then stores the measurements in a results file for return back to the central controller. At the central controller, results files from one or more benchmarking applications are stored in a data store for comparative and statistical analysis.

20 Claims, 4 Drawing Sheets

(58) Field of Classification Search
CPC ......... G06F 8/20; G06F 8/314; H04L 43/065; H04L 43/0817; H04L 41/18; H04L 41/046; H04L 43/08; H04L 47/70; H04L 47/805; H04L 47/808; H04L 47/822; H04L 47/829; H04L 43/12; H04L 43/14; H04L 43/16; H04L 43/0852; H04L 43/10; H04Q 9/00; G08C 25/00; G07C 3/00; G06Q 40/04

See application file for complete search history.

(56) References Cited

U.S. PATENT DOCUMENTS

| Patent/Pub. No. | Date | Inventor | Class |
|---|---|---|---|
| 6,477,483 B1 | 11/2002 | Scarlat et al. | |
| 6,560,564 B2 | 5/2003 | Scarlat et al. | |
| 6,654,948 B1* | 11/2003 | Konuru et al. | 717/127 |
| 7,716,535 B2* | 5/2010 | Cunningham et al. | 714/48 |
| 7,721,154 B1* | 5/2010 | Jaamour | G06F 11/3624 714/38.14 |
| 7,757,214 B1* | 7/2010 | Palczak | G06F 9/5083 709/223 |
| 7,809,825 B2* | 10/2010 | McMahan et al. | 709/224 |
| 8,301,759 B2* | 10/2012 | Pietrek et al. | 709/224 |
| 8,447,851 B1* | 5/2013 | Anderson | G06F 11/3006 707/600 |
| 8,719,804 B2* | 5/2014 | Jain | 717/140 |
| 8,739,282 B1* | 5/2014 | Jayaraman | G06F 21/53 713/187 |
| 8,795,138 B1* | 8/2014 | Yeh | A61B 5/4815 482/1 |
| 8,819,171 B2 | 8/2014 | Chakraborty et al. | |
| 8,832,267 B2* | 9/2014 | Kupershmidt et al. | 709/224 |
| 8,839,200 B1* | 9/2014 | Roskind | 717/127 |
| 8,997,088 B2* | 3/2015 | Gurikar | G06F 11/3688 717/168 |
| 9,158,586 B2* | 10/2015 | Rothschild | G06F 3/067 |
| 2002/0177977 A1 | 11/2002 | Scarlat et al. | |
| 2002/0194393 A1* | 12/2002 | Hrischuk | G06F 9/542 719/318 |
| 2003/0056200 A1* | 3/2003 | Li | G06F 11/3612 717/128 |
| 2005/0137961 A1* | 6/2005 | Brann | G06Q 40/04 705/37 |
| 2006/0156284 A1* | 7/2006 | Srinivasan | G06F 8/20 717/119 |
| 2007/0100987 A1* | 5/2007 | Aggarwal | G06F 11/3495 709/224 |
| 2008/0127083 A1* | 5/2008 | Brown | G06F 11/3428 717/121 |
| 2009/0083717 A1 | 3/2009 | Branson et al. | |
| 2009/0319658 A1* | 12/2009 | Chioiu | H04L 43/0817 709/224 |
| 2009/0327476 A1* | 12/2009 | Grell | G06Q 40/00 709/224 |
| 2009/0328055 A1* | 12/2009 | Bose et al. | 718/105 |
| 2010/0125664 A1 | 5/2010 | Hadar et al. | |
| 2010/0191505 A1* | 7/2010 | Chen | H04L 43/0852 702/182 |
| 2011/0087927 A1* | 4/2011 | Arnold | G06F 11/366 714/38.1 |
| 2011/0295999 A1* | 12/2011 | Ferris | G06F 9/5072 709/224 |
| 2012/0159454 A1* | 6/2012 | Barham | G06F 9/45558 717/128 |
| 2012/0166430 A1* | 6/2012 | Bakalov | G06F 11/3006 707/723 |
| 2012/0239739 A1 | 9/2012 | Manglik et al. | |
| 2012/0290880 A1* | 11/2012 | Bardack | G06F 11/0709 714/37 |
| 2012/0297059 A1* | 11/2012 | Bross | G06F 11/3006 709/224 |
| 2012/0311111 A1* | 12/2012 | Frew | G06F 9/5072 709/221 |
| 2013/0024919 A1* | 1/2013 | Wetter | G06F 21/335 726/6 |
| 2013/0060837 A1 | 3/2013 | Chakraborty et al. | |
| 2013/0111489 A1* | 5/2013 | Glew | G06F 9/4881 718/103 |
| 2013/0124714 A1* | 5/2013 | Bednar | G06F 9/45558 709/224 |
| 2013/0145349 A1* | 6/2013 | Basak | G06F 9/44505 717/121 |
| 2013/0275382 A1* | 10/2013 | Chi | G06F 17/303 707/654 |
| 2013/0282891 A1* | 10/2013 | Davis et al. | 709/224 |
| 2013/0283102 A1* | 10/2013 | Krajec | G06F 11/3636 714/38.1 |
| 2013/0290708 A1* | 10/2013 | Diaz | H04L 41/28 713/165 |
| 2013/0332588 A1* | 12/2013 | Maytal et al. | 709/223 |
| 2013/0346161 A1 | 12/2013 | Mayerle | |
| 2014/0047096 A1* | 2/2014 | Kupershmidt et al. | 709/224 |
| 2014/0089493 A1* | 3/2014 | Bauer et al. | 709/224 |
| 2014/0136297 A1* | 5/2014 | Milano | G06Q 10/06393 705/7.39 |
| 2014/0136754 A1* | 5/2014 | Hyde et al. | 711/103 |
| 2014/0317681 A1* | 10/2014 | Shende | H04L 63/10 726/1 |
| 2014/0344831 A1* | 11/2014 | Levine | G06F 9/52 718/107 |
| 2014/0372807 A1* | 12/2014 | Poola | G06F 11/3452 714/39 |
| 2015/0006733 A1* | 1/2015 | Khan | H04L 47/70 709/226 |
| 2015/0052402 A1* | 2/2015 | Gurumurthy | G06F 11/3688 714/38.1 |
| 2015/0120822 A1* | 4/2015 | Li | G06F 9/5055 709/203 |
| 2015/0154039 A1* | 6/2015 | Zada et al. | 709/223 |
| 2015/0169291 A1* | 6/2015 | Dube | G06F 8/20 717/101 |
| 2016/0006640 A1* | 1/2016 | Masuda | G06F 11/3495 709/224 |

OTHER PUBLICATIONS

Makhija et al., "VMmark: A Scalable Benchmark for Virtualized Systems", Sep. 25, 2006, Technical Report VMware-TR2006-002, (14 pages total).*

Kissel, "Glossary of Key Information Security Terms", NISTIR 7298:Revison 2, May 2013 (222 pagest total).*

Agilent Technologies, "Agilent Impedance Measurement Handbook: A guide to measurement technology and techniques", Fourth Edition, Sep. 10, 2013, Agilent Technologies (140 pages total).*

Ogle et al, "Minimizing Costs:Choosing Between Tracing and Sampling", 1990, IEEE Publishing, (7 pages total).*

Kumar et al., "A Benchmark Suite for Evaluating Configurable Computing Systems-Status, Reflections, and Future Directions", 2000, ACM, (9 pages total).*

Deza et al., "Encyclopedia of Distances", Springer, 2009, (584 pages total).*

Makhija et al., "VMmark: A Scalable Benchmark for Virtualized Systems", Sep. 25, 2006, Technical Report VMware TR2006-002, (14 pages total).*

Fleming et al., "How Not to Lie With Statistics: The Correct Way to Summarize Benchmark Results", 1986, ACM (4 pages total).*

Reitbauer et al., "Application Performance Concepts", 2012, Compuware Corporation.*

Meng et al., "State Monitoring in Cloud Data Centers", Sep. 2011, IEEE Transactions on Knowledge and Data Center Engineering, vol. 23, IEEE.*

Kumar, "Snapshot Based Virtualization Mechanism for Cloud Computing", International Jouinal of Computer Sciences, vol. 9, Issue 5, No. 2.*

Lenk et al., "Requirements for an IaaS Deployment Language in Federated Clouds", Dec. 12-14, 2011, 2011 IEEE International (56) References Cited

OTHER PUBLICATIONS

Conference on Service-Oriented Computing and Applications, IEEE Publishing (4 pagest total).*
"International Search Report and Written Opinion" for PCT/US2015/022162, dated Jul. 1, 2015, 7 pages.
Extended European Search Report dated Dec. 5, 2017 for European Application No. 15768434.1, 9 pages.

* cited by examiner

CLOUD COMPUTING BENCHMARKING

BACKGROUND

Enterprises and other companies may reduce information technology ("IT") costs by externalizing hardware computing costs, hardware maintenance and administration costs, and software costs. One option to externalize IT costs is by purchasing cloud computing processing and hosting from a third party cloud computing provider. Cloud computing providers purchase and maintain computer servers typically in server farms, and act as a utility company by reselling their computing capacity to customers. Some customers may be value added resellers ("VARs"), that are software companies who host their software applications on computing capacity from cloud providers. These VARs then make money by selling access to their software applications to customers. In this way, cloud computing providers directly externalize hardware computing costs and hardware maintenance costs, and indirectly externalize software costs by providing a hosting platform for VARs.

Cloud computing providers typically add infrastructure services, that provide common services for the cloud provider. Some infrastructure services are operating system-like services that control allocation of services of the cloud. For example, physical servers in server farms are typically disaggregated and resold in unitary blocks of service in the form of processing power, memory, and storage. Specifically, a unitary block is some unit to inform a customer of the volume of computing capacity purchased from a cloud provider. Consider a customer that purchases a unitary block of denoted, for example, one "virtual processor". That customer may in fact be purchasing processing power where the virtual process is provided by different cores on a processor, different processors on the same physical server, or potential processing cores on different physical servers. The unitary block measuring computer service is proffered by the vendor, rather than a third party operating at arm's length.

Other infrastructure services provide services that support the cloud provider business model. For example, cloud providers typically provide different billing options based on metering a customer's usage on the cloud. A billing infrastructure is an example of an infrastructure service that supports the cloud provider business model. However, metering, service level agreements, and ultimately billing are often provided in terms of a vendor's chosen unitary measure.

Accordingly, customers are obliged to independently verify vendor claims about the unitary measure, or alternatively simply take the vendor at their word. Thus customers are faced with evaluating cloud provider claims without a ready point of reference.

Verification of claims about unitary services is not trivial. Cloud providers use infrastructure services as competitive differentiators to attract customers and VARs. For example, yet other infrastructure services provide abstractions that facilitate application development and hosting on the cloud. Well known examples include Platform-as-a-Service ("PAAS"), Infrastructure-as-a-Service ("IAAS") and Software-as-a-Service ("SAAS") hosting and development infrastructure.

Thus additionally, customers who seek to compare cloud providers are faced with evaluating different hardware configurations, different software configurations, and different infrastructure services, often without transparency to the operation of different cloud providers.

BRIEF DESCRIPTION OF THE DRAWINGS

The Detailed Description is set forth with reference to the accompanying figures.

DETAILED DESCRIPTION

Cloud Computing and Benchmarking
Measurement and Benchmarking

The present disclosure describes benchmarking from the perspective of benchmarking cloud computing. Before discussing benchmarking cloud computing, the present disclosure will describe some preliminaries regarding benchmarking.

Benchmarking is the selection of one or more indicia that are used to compare one item to another or one item to an idealized version of that item. In the case of computer science, common comparative indicia may include software performance, hardware performance, overall system performance. For example volume of data processed, number of faults, and memory usage may be candidate metrics for benchmarking software performance. A particular software implementation may be compared to a competing implementation. Alternatively, the software implementation might be compared to the theoretical optimum values of those metrics. Regardless of what metrics are chosen, the aggregating of those chosen metrics constitutes benchmarking.

Since the indicia chosen to constitute a benchmark are used for comparisons, the indicia chosen are to be based on a measure. A measure is sometimes called a distance function that is a value based on a comparison. Measure can be categorized by their behavior upon comparing measure values, called measurements, against each other. Measures may come in the following four categories.

i. Different Categories

Indicia may be placed in different categories. Here, the indicia indicates what kind of item, something is. It does not indicate whether something is better or worse than another item. Rather it simply indicates that it is different and should be treated and/or evaluated differently. For example, a cloud infrastructure service might be classified as PAAS, IAAS, or SAAS. None of the three options are necessarily better or worse, rather just in different categories.

ii. Ordered Categories

Indicia may be placed in ordered categories. Here, the categories have a clear order as to which categories is more desirable. Typically the categories are ordered in monotonically increasing order, such as from worst to best. For example, customer satisfaction with a cloud vendor might be classified from "bad", "average", "good" and "excellent." Therefore, a cloud vendor classified as "excellent" might be considered better than another classified as "average." However, there is no indication of degree of how much better an "excellent" vendor is over another that is merely "average."

iii. Additive Categories

Indicia may be additive. Additive indicia allow multiple measurements to be aggregated into a single measurement, where order is preserved. For example, number of processors on a server for parallel processing is additive. Two processors generally are able to do more processing than one processor. However, two processors are not necessarily able to do twice as much processing as one processor, due to communications overhead and/or the possibility of the processors being heterogeneous. So additive indicia do not scale.

iv. Scalable Measurements

Indicia may be scalable. Not only are scalable indicia additive, scalable indicia support all arithmetic operations including multiplication and division. For example, megaflops per second ("MFLOPS") is an indicium that is a scalable measure. A processor that can perform 2,500 MFLOPS is two and half times as powerful as a processor that can perform 1,000 MFLOPS.

Additive and scalable measures are sometimes called metrics, because the distance function comprising the measure satisfies the mathematical properties of separation, coincidence, symmetry and the triangle inequality. Regarding the latter, a measure satisfies the triangle inequality if the measurements between A and C is greater than or equal to the measurement between A and B added to the measurement between B and C. Expressed mathematically, F(x, y) satisfies the triangle inequality if:

$$F(A,C) \leq F(A,B) + F(B,C).$$

Metrics provide the basis for performing statistical functions, many of which are based on arithmetic operations. Accordingly, metrics are desirable measures, because they enable statistical techniques to be brought to bear during analysis. For example, consider the function for a standard deviation:

$$stddev(x) = \sqrt{\frac{\sum_{i=1}^{n}(x-\bar{x}^2)}{n-1}}$$

The standard deviation function is comprised of square roots and exponents which use multiplication, summations which use addition, averages which use division, and the like. Thus the standard deviation function is mathematically and statistically meaningful where a metric is used as a measurement.

Goals in Benchmarking Cloud Computing

Turning to the application of benchmarking to cloud computing, there are several potential cloud provider evaluation goals that are driven by business operations. The evaluation goals may include a potential business decisions to:

move to an alternative cloud provider;
    evaluate a service design of a cloud provider;
    verify continuity of service from a cloud provider over time;
    verify consistency of service over different service/geographic zone for a cloud provider;
    verify a cloud provider can support a migration to that cloud provider;
    enable service/price comparisons between different cloud providers;
    verify terms of a service level agreement are satisfied;
    evaluate performance times hibernation and re-instantiation by services of a cloud provider;
    performance; and
    evaluate and validate service change management in a cloud provider.

These evaluation goals may be achieved by identifying and selecting indicia to comprise a benchmark. The indicia may support simple difference comparisons, between one or more systems. Alternatively, the indicia may provide the basis to define a measure in terms of one or more normalized units to make baseline measurements. Defining a normalized unit that supports a metric enables bringing not only direct comparisons, but also statistical techniques to support a comprehensive evaluation.

The selected indicia are chosen on the basis of either being an indicium of a cloud provider's performance, functionality, or characteristics, known collectively as a PFC. Performance indicia are artifacts that indicate how a cloud provider performs under a work load, for example processor usage percentage. Functionality includes computing features that are available from the cloud provider, for example a maximum of 4 GB memory available to a virtual server instance. Characteristics differentiate categories for cloud providers, such as type of billing model. The selected indicia may be measured with varying frequency. In some situations, a single measurement may be made over the lifetime of a benchmarking cycle. In others, multiple measurements are made either periodically, according to a predetermined schedule, or upon detecting an event or condition.

Cloud computing benchmarks may comprise indicia that allow for the aggregation of measurements over time. Specific indicia may be selected to continuously, periodically, or at selected intervals measure and track the overall performance capability over time. This enables the development of complex algorithms which may include for example the overall performance capabilities across systems; the impact of multiple demands on a system; impact to the system's capabilities; and their respective trend over time. A specific benchmark may be to capture the processor maximum performance over time, to capture the network throughput over time and to combine these measures based on a workload demand to generate a predictive model of what the maximum processor capability is given a variable network throughput. While this benchmark example outlines two indicia, by definition, the overall performance capability will be impacted by all of the demand on the cloud provider. Thus, the measurement of indicia is enhanced by the temporal view that enables adaptive and predictive modeling based on customer defined indicia.

Potential indicia include indicia in the following categories.

i. Compute

The compute category covers information about the physical and/or virtual processor cores used by servers in a cloud provider. In general, computing processors are known as computing processing units ("CPUs"). The following table lists potential indicia in the compute category.

TABLE 1

Compute Indicia

| Indicia | Description | Update Frequency | PFC Test |
|---|---|---|---|
| CPUs allocated | How many CPU cores are configured for this server | once | Functionality (Validation Test) |
| CPU usage per core | CPU usage percentage - one column of raw data per core | frequent | Performance (Stress Test) |
| CPU speed | Speed in gigahertz (GHz) of each core in the CPU | once | Functionality (Validation Test) |
| integer | Number of integer math | frequent | Performance |

TABLE 1-continued

Compute Indicia

| Indicia | Description | Update Frequency | PFC Test |
|---|---|---|---|
| ops/sec | operations can be performed in one second | | (Stress Test) |
| float ops/sec | Number of single-precision floating-point math operations can be performed in one second | frequent | Performance (Stress Test) |
| user mode vs. kernel mode vs. idle | Percentage of CPU usage devoted to user processes vs. the OS | frequent | Functionality (Validation Test) |
| top 5 CPU hogs | processes using the most CPU time | frequent | Functionality (Validation Test) |
| thread count | How many threads are in use (per process, total for the machine) | frequent | Performance (Stress Test) | ii. Memory

The memory category covers information about the physical and/or virtual (swap) random access memory ("RAM") used by servers in a cloud provider. The following table lists potential indicia in the memory category.

TABLE 2

Memory Indicia

| Indicia | Description | Update Frequency | PFC Test |
|---|---|---|---|
| total RAM | How much RAM is allocated to the server | once | Functionality (Validation Test) |
| total swap | How much disk space is allocated for swap space | once | Functionality (Validation Test) |
| allocated memory | How much of the system's memory is currently in use | frequent | Performance (Stress Test) |
| page faults | Number of times that a process requested something from RAM but it had to be retrieved from swap | frequent | Functionality (Validation Test) |
| memory usage | Total/Allocated/free statistic for RAM and swap | frequent | Performance (Stress Test) |
| top 5 memory hogs | processes using the most memory | frequent | Functionality (Validation Test) |
| queue size | Amount of RAM devoted to data for processes that are not currently active | frequent | Functionality (Validation Test) | iii. Disk

The disk category covers information about the storage media available via the operating system or disk drives used by servers in a cloud provider. The following table lists potential indicia in the disk category.

TABLE 3

Disk Indicia

| Indicia | Description | Update Frequency | PFC Test |
|---|---|---|---|
| total capacity (per file system) | How much disk space is allocated to the server | once | Functionality (Validation Test) |
| used capacity (per file system) | How much disk space is used by the system | frequent | Functionality (Validation Test) |
| disk writes/sec | How many disk writes can be/ have been performed in a second | frequent | Performance (Stress Test) |

TABLE 3-continued

Disk Indicia

| Indicia | Description | Update Frequency | PFC Test |
|---|---|---|---|
| disk reads/sec | How many disk reads can be/ have been performed in a second | frequent | Performance (Stress Test) |
| permissions | check permissions to ensure that applications have the proper amount of permissions to act and that permissions for critical files have not changed | frequent | Functionality (Validation Test) |
| IOWAIT time (input/output wait time) | Processes that cannot act because they are waiting for disk read/write | frequent | Performance (Stress Test) | iv. Operating System

The operating system ("OS") category covers information about the operating system used by servers in a cloud provider. The following table lists potential indicia in the operating system category.

TABLE 4

Operating System Indicia

| Indicia | Description | Update Frequency | PFC Tests |
|---|---|---|---|
| Version | What OS Version is running on the system | once | Functionality (Validation Test) |
| kernel parameters | Any changes in kernel parameters | frequent | Functionality (Validation Test) |
| scrape the boot screen | Information gathered from the console logs during system boot | frequent | Functionality (Validation Test) |
| check syslog for errors | Check the console logs and other system logs for errors | daily | Functionality (Validation Test) |
| context switching time (to go from user to kernel mode) | How much time have processes spent switching from user application to OS kernel mode | frequent | Performance (Stress Test) |
| number of running processes | Count of running processes | frequent | Performance (Stress Test) |
| zombie processes | Child processes that did not terminate when the parent process terminated | frequent | Functionality (Validation Test) | v. Network

The network category covers information about the server's connection to its local area network ("LAN") and to the Internet for servers in a cloud provider. The following table lists potential indicia in the network category.

TABLE 5

Network Indicia

| Indicia | Description | Update Frequency | PFC Tests |
|---|---|---|---|
| IP address/gateway/ subnet mask | Basic information about the system's IP configuration | once | Functionality (Validation Test) |
| upload speed | Time to send a file of known size to a known external host | frequent | Performance (Stress Test) |
| download speed | Time to receive a file of known size from a known external host | frequent | Performance (Stress Test) |

TABLE 5-continued

Network Indicia

| Indicia | Description | Update Frequency | PFC Tests |
|---|---|---|---|
| number of IP connections | Total number of open TCP and UDP socket connections | frequent | Performance (Stress Test) |
| number of SSL (secure socket link) connections (or per other interesting port) | Total number of connections over an enumerated list of ports relevant to the application running on the server | frequent | Performance (Stress Test) |
| roundtrip ping time | Time to receive an ICMP echo from a known host | frequent | Performance (Stress Test) |
| traceroute to pre-defined location (including latency) | Connection time, hop count, and route to a known host | frequent | Performance (Stress Test) |
| DNS (domain name server) checks using primary or secondary DNS | Time to resolve a known hostname, and which DNS server was used | frequent | Performance (Stress Test) |
| ARP cache | ARP table of open IP connections | frequent | Functionality (Validation Test) |
| virtual IP (internet protocol address) | List of all virtual IPs assigned to this host by its load balancer | frequent | Functionality (Validation Test) | vi. Database

The database ("DB") category covers information about a structured query language ("SQL") or noSQL database management system ("DBMS") application running on servers in a cloud provider. The following table lists potential indicia in the database category.

TABLE 6

Database Indicia

| Indicia | Description | Update Frequency | PFC Tests |
|---|---|---|---|
| Database version | Type and Version of the running database system | once | Functionality (Validation Test) |
| DB writes local | Time to write a transaction of known size to the DB on the localhost | frequent | Performance (Stress Test) |
| DB writes over IP | Time to write a transaction of known size from a known external host to the DB on the localhost | frequent | Performance (Stress Test) |
| DB reads local | Time to read a transaction of known size from the DB on the localhost | frequent | Performance (Stress Test) |
| DB reads over IP | Time to read a transaction of known size to a known external host from the DB on the localhost | frequent | Performance (Stress Test) |
| DB calculation | Time to perform a known math calculation within the database | frequent | Performance (Stress Test) |
| growth rate of the DB data files | Check the current size of the DB fdes, including raw datafde/partition size, row count, etc. | frequent | Functionality (Validation Test) | vii. Cloud Provider

The cloud category covers information about the cloud provider in which the server is instantiated. In some cases, the indicia may be in terms of a normalized work load unit. The following table lists potential indicia in the cloud provider category.

TABLE 7

Cloud Indicia

| Indicia | Description | Update Frequency | PFC Tests |
|---|---|---|---|
| Load unit measurements from server stopped responding | Detect when a load unit measurement check is delayed or missing from a given server | frequent | Functionality (Validation Test) |
| provisioning speed CPU | Time to create a new server instance of a given size in a given availability zone (e.g. by creating a tailored area of mutual interest (AMI) to provision identical machines and report back about provisioning time) | frequent | Performance (Stress Test) |
| Provisioning speed Storage | Time to create new storage | frequent | Performance (Stress Test) |
| migrate server to another datacenter | Time to create a snapshot and clone the instance of a server in a different availability zone | frequent | Performance (Stress Test) |
| cluster information | Information about other servers related to this one, like server farms, database clusters, application rings | frequent | Functionality (Validation Test) |

Cloud Computing Benchmarking Issues

Selection of indicia for a benchmark may be driven by the consumer of the benchmark. A basis for a benchmark to be accepted by a consumer is that the consumer trusts the measurement. There are several factors that may affect the trust of a measurement.

i. The Observation Problem aka Heisenberg

The act of observing a system will affect a system. When a measurement consumes computing resources as to affect the observable accuracy of a measurement, the measurement will not be trusted. This problem is also known as the "Heisenberg" problem. In the case of cloud computing, a benchmarking application running within a cloud instance will use processing, memory, and network resources. In particular, since cloud communications are typically geographically disparate, network latency during measurement may have a significant adverse impact on measurement accuracy. Furthermore, cloud infrastructure services often have sophisticated "adaptive" algorithms that modify resource allocation based on their own observations. In such situations, it is very possible that a benchmarking application may become deadlocked.

One approach is to guarantee performance overhead of a benchmarking application to be less than some level of load/processing core overhead. Measurements would be compared only on like systems. For example a Windows™ based platform would not necessarily be compared to a Linux platform. Also, memory and network overhead could be managed by carefully controlling collected data is transferred. For example, benchmark data may be cached on a local disk drive and will transfer upon an event trigger such as meeting a predetermined threshold to limit disk load. Since data transfer potentially creates network load, data may be transferred upon receiving a transfer command from a remote central controller.

Another approach may be to understand the statistical behavior of the system to be benchmarked. If an accurate statistics model is developed, then a statistically small amount of benchmarking data may be collected, and the measurement projected by extrapolation based on the statistics model. For example, a workload over time model may be developed where an initial measurement is made at the beginning of benchmarking. Since the initial measurement theoretically occurs before any additional workload, that initial measurement may be used as a theoretical processing maximum to compare subsequent measurements against.

Statistical models may be comprised where a cloud provider has infrastructure services that are adaptive. For example, a measurement at time $T_0$ may not be comparable at time $T_n$ if the cloud provider silently reconfigured between the two times. However, properly designed normalized unit should continue to be a normalized unit. Thus even if measurements may not be consistently comparable, the performance changes may be detected over time. Thus the adaptations of the cloud infrastructure and the triggers for those adaptations may be detected, and the benchmarking application may be configured to avoid those triggers or to compensate.

Yet another approach is to limit benchmarking under predetermined conditions. Some conditions are detected prior to benchmarking, and other conditions are detected during benchmarking. Regarding the former, given that the benchmarking application can negatively impact its environment, the central controller may have an "emergency stop" button customer that halts at least some of the benchmarking on at least some cloud provider instances under test. For example, a configuration file received by the benchmarking application may contain a "permit to run" flag. Before starting benchmarking, the benchmarking application may poll the central controller for the most recent configuration file. If there have been no changes the benchmarking application may receive a message indicating that the configuration file has not changed along with a set "permit to run" flag, and that the benchmarking application is permitted to start benchmarking. In this case, the benchmarking application will use the present configuration file and commence benchmarking. If the "permit to run" flag is not set, then the benchmarking application will not commence testing. In case where the benchmarking application cannot communicate with the central controller, the benchmarking application may default to not benchmarking and will assume the "permit to run" flag is not set. Regarding the detecting of conditions during benchmarking, the benchmarking application may gather at least some environment data for the cloud provider instance under test. If the benchmarking application detects that the environment data satisfies some predetermined condition, such as some or all of the current environment data being in excess of a predetermined level, then the benchmarking application may prevent benchmarking from starting.

Note that the benchmarking application under operation would only effect performance data collection, if at all. Thus functionality and characteristic data may continue to be collected without compromising the cloud performance instance under test.

ii. Meaningful Statistics

Books have been written about how to characterize statistics. For some, the risk is that the consumer is overly credulous when confronted with statistics, and may conflate the reception of statistics with a full analysis in making a business decision. For others, the risk is that the consumer has been exposed to shoddy statistical analysis, and may be overly suspicious of all statistics. Benchmarking trustworthiness may be based on some of the following factors: the results are verifiable, the methodology is transparent and verifiably accurate, and the methodology is repeatable.

Consumer trust may be engendered by methodology transparency. For example, reporting may clearly indicate that a statistically significant amount of data has not yet been collected when reporting a benchmark. One way to ensure statistical significance is to take an initial measurement at the beginning of benchmarking and to track frequency/periodicity and timing of data sampling. Alternatively, reporting may indicate a confidence level, potentially calculated by the sampling frequency/periodicity and timing data. In this way, the consumer's desire for immediate data may be balanced against potential inaccuracies.

In addition to transparency, benchmarking may be performed by trusted third parties. Past benchmarks have been "gamed" by vendors, where the vendor implemented features specifically to optimize benchmark reports, without commensurate genuine improvements. While vendors may continue to game benchmarks, having a trusted third party owning the benchmarking infrastructure allows that third party to independently verify results, and modify the benchmarks as vendor gaming is detected.

Benchmarking is ideally repeatable. In other words, the performance reported by a benchmark should be similar to a separate test under similar test conditions. In general, samplings of indicia or benchmarking may be time/stamped. Accordingly, arbitrary time sets may be compared to each other in order to determine whether the benchmarking results were repeatable.

iii. Security

Benchmarking data and performance data are inherently sensitive. Cloud providers and VARs will not like poor performance results to be publicized. Furthermore, the integrity of the benchmarking system has to be protected from hackers, lest the collected results be compromised.

Security is to be balanced against processing overhead giving rise to a Heisenberg observation problem. For example, cryptography key exchange with remote key servers gives rise to network load. Such measurements may render at least network measurements inaccurate. However, sensitive data is ideally encrypted. Encryption overhead may be minimized by selectively encrypting only the most sensitive data and/or by encrypting portions of the data.

By way of an example, a benchmarking application may include a configuration file that may define the behavior of that benchmarking application. Therefore, the configuration file is to be delivered securely so that it is not a point of insertion for rogue instructions that would put the benchmarking operation at risk. The configuration file may be encrypted and/or make use of message digests to detect tampering. Hash algorithms and/or security certificates may be used to allow the benchmarking application to validate the configuration file prior to any benchmarking. For example, a configuration file may be identified as work only with a specified target cloud provider instance identifier, a version identifier, a time stamp, and a security identifier. The benchmarking application may be configured to only load and/or execute the configuration file only if some predetermined subset of these identifiers, or if all of these identifiers are validated and authorized.

Since the benchmarking application has not begun benchmarking prior to receiving and validating the configuration file, any network load from accessing key servers is not measured, and therefore will not cause a Heisenberg observation problem.

Note that the security of benchmarking is not the same as testing the security of the cloud provider. However, security testing of the cloud provider may be a function of the benchmarking application. Part of benchmarking applications capabilities may be to adapt its measurements based on an understanding of the relationship between both latency and security service checks. An initial benchmark measurement and can be validated across a number of clouds to identify the difference between the latency for a non-secure transaction and the latency for a security impacted latency for secure transactions. This difference may then be factored into the ongoing tests to confirm consistent performance.

Context of Cloud Computing Benchmarking

Figure 1:
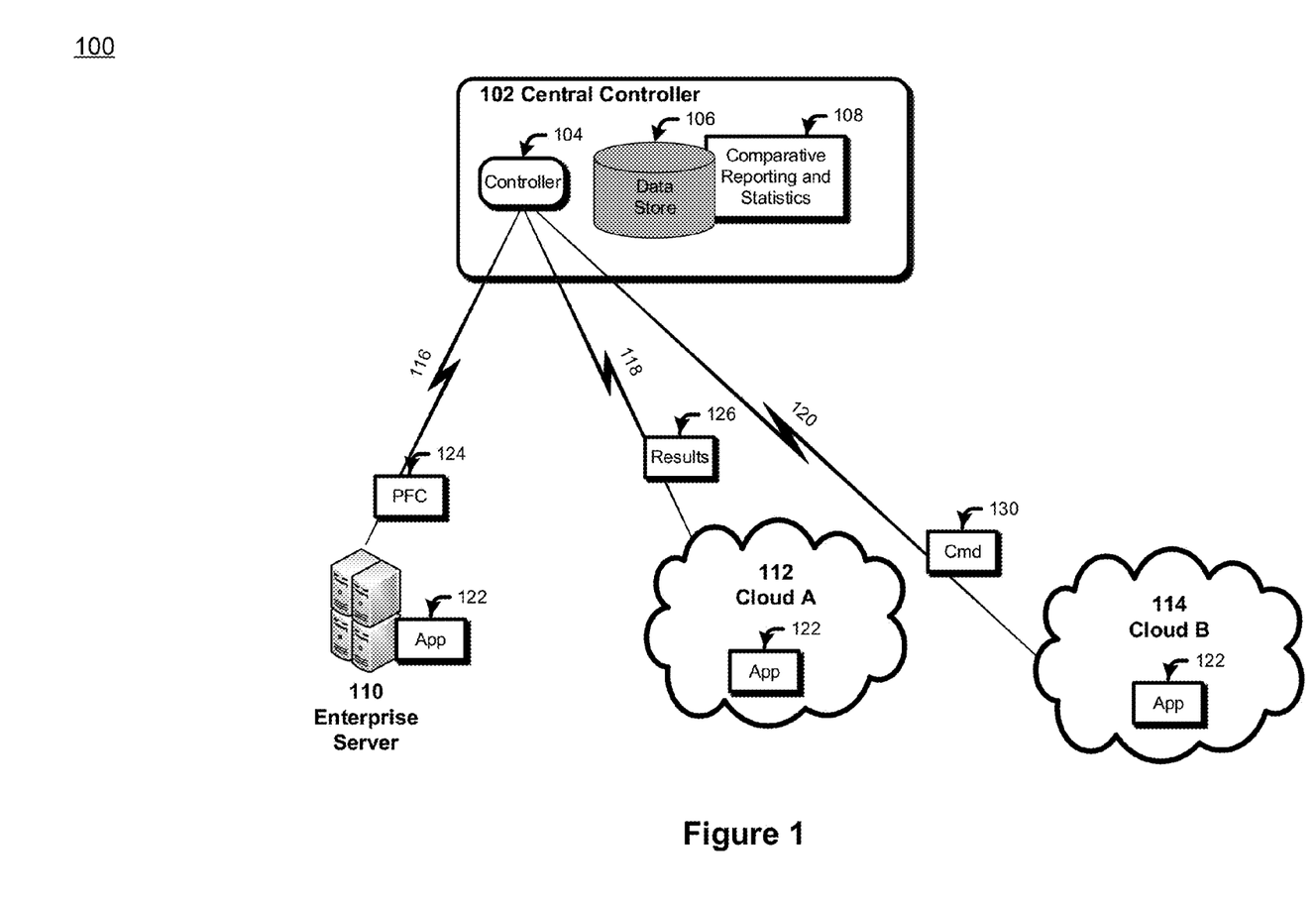
FIG. 1 is a top level context diagram for cloud computing benchmarking.

FIG. 1 is an exemplary context diagram for a cloud computing benchmarking infrastructure 100.

The cloud computing benchmarking infrastructure 100 may comprise a central controller 102. The central controller 102 may be local or remote to the cloud provider. For example, where the central controller 102 may be guaranteed to be in the same server cluster as the cloud provider instance under test, it may be desirable to host the central controller 102 locally as to reduce network latency. However, the central controller 102 may be located on a remote computer to provide a single point of control where multiple cloud provider instances are to be tested.

Central controller 102 may comprise a controller application 104 a data store 108 to store benchmarks, benchmarking results, configuration files, and other related data for cloud computing benchmarking. For example, in addition to storing benchmarking results and collected raw indicia data, the central controller 102 may perform comparative reporting and statistics, or other automated analysis, and store that analysis on data store 108.

The cloud computing benchmarking infrastructure 100 may benchmark enterprise servers 110 on a local area network ("LAN"). Alternatively, cloud computing benchmarking infrastructure 100 may benchmark one or more clouds 112, 114. Note that clouds 112, 114 need not be the same type of cloud. For example, cloud 112 may be a PAAS infrastructure and cloud 114 may be a SAAS infrastructure. Communications connections between the central controller 102 and enterprise servers 110 and clouds 112 and 114 may be effected via network connections 116, 118, 120 respectively.

Network connections 116, 118, 120 may be used to send/install a benchmarking application 122 on enterprise servers 110 and/or clouds 112, 114.

Once benchmarking application 122 is installed, the benchmarking application 122 may request a configuration file 124 indicating which PFC are to be collected may be sent to enterprise servers 110 and/or clouds 112 from central controller 102. Accordingly, the benchmarking application 122 may operate on a pull basis. Alternatively, central controller 102 may push a configuration file 124 to enterprise servers 110 and/or clouds 112.

Periodically, benchmarking application 122 may send benchmarking data results 126 back to the central controller 102 for storage in data store 108. The sending may be based on a predetermined condition being detected, such as benchmarking completing. Alternatively, the central controller 102 may affirmatively request some or all of the benchmarking data results 126.

The central controller 102 may affirmatively send commands 130 to the benchmarking application 122. For example, it may send a "permit to run" flag set to "on" or "off" In the latter case, the benchmarking application may stop upon reception of command 130.

Exemplary Hardware Platform for Cloud Computing Benchmarking

Figure 2:
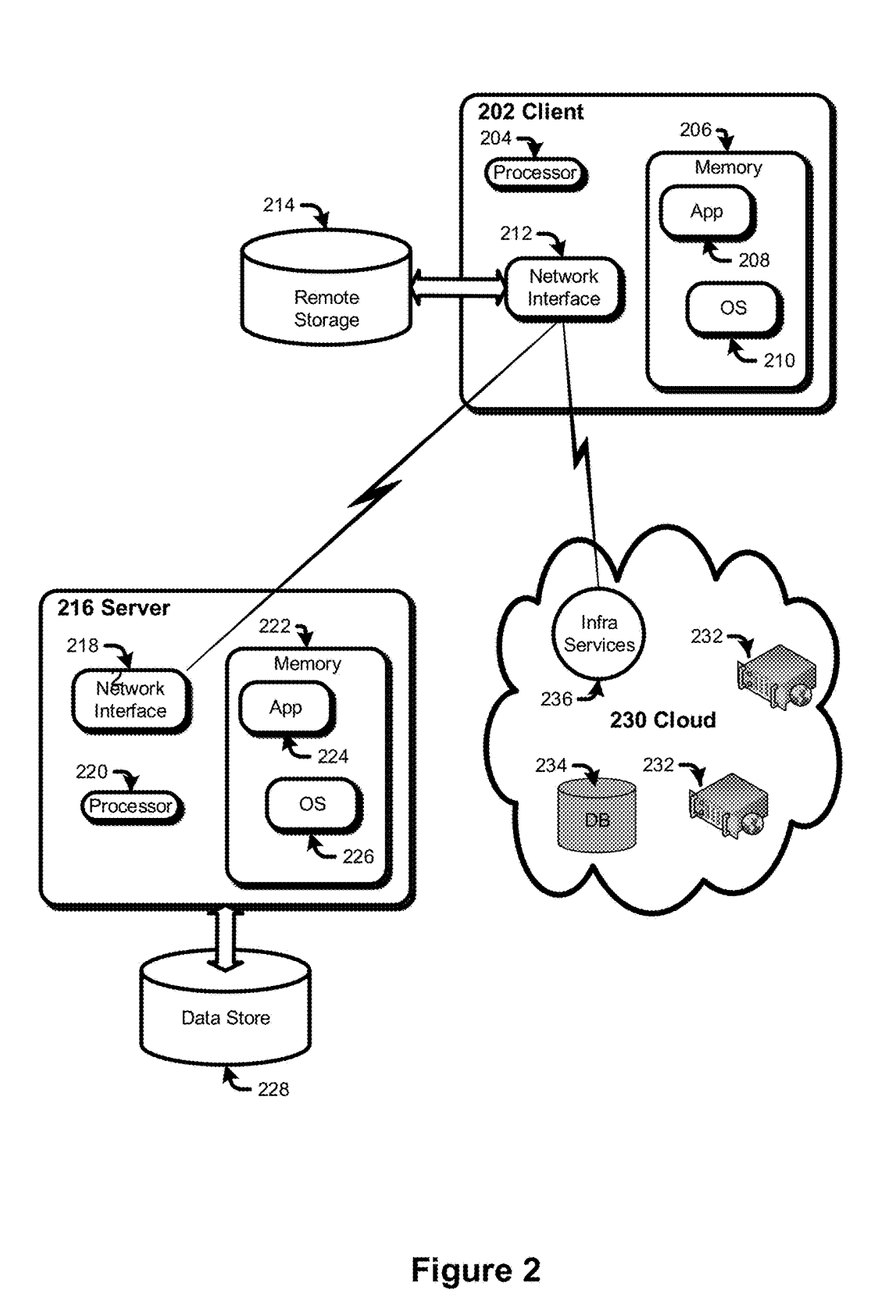
FIG. 2 is a hardware diagram of an exemplary hardware and software platform for cloud computing benchmarking.

FIG. 2 illustrates one possible embodiment of a hardware environment 200 for cloud computing benchmarking.

Client device 202 is any computing device. A client device 202 may have a processor 204 and a memory 206. Client device 202's memory 206 is any computer-readable media which may store several programs including an application 208 and/or an operating system 210.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, client device 202 may have a network interface 212. The network interface 212 may be one or more network interfaces including Ethernet, Wi-Fi, or any number of other physical and data link standard interfaces. In the case where the programming language transformations are to be done on a single machine, the network interface 212 is optional.

Client device 202 may use the network interface 212 to communicate to remote storage 214. Remote storage 214 may include network aware storage ("NAS") or may be removable storage such as a thumb drive or memory stick.

Client device 202 may communicate to a server 216. Server 216 is any computing device that may participate in a network. Client network interface 212 may ultimate connect to server 216 via server network interface 218. Server network interface 218 may be one or more network interfaces as described with respect to client network interface 212.

Server 216 also has a processor 220 and memory 222. As per the preceding discussion regarding client device 202, memory 222 is any computer-readable media including both computer storage media and communication media.

In particular, memory 222 stores software which may include an application 224 and/or an operating system 226. Memory 222 may also store applications 224 that may include a database management system. Accordingly, server 216 may include data store 228. Data store 228 may be configured as a relational database, an object-oriented database, and/or a columnar database, or any configuration to support policy storage.

Server 216 need not be on site or operated by the client enterprise. Server 216 may be hosted in a cloud 230. Cloud 230 may represent a plurality of disaggregated servers which provide virtual web application server 232 functionality and virtual database 234 functionality. Cloud 230 services 232, 234 may be made accessible via cloud infrastructure 236. Cloud infrastructure 236 not only provides access to cloud services 232, 234 but also billing services. Cloud infrastructure 236 may provide additional service abstractions such as Platform as a Service ("PAAS"), Infrastructure as a Service ("IAAS"), and Software as a Service ("SAAS").

Exemplary Architecture for Cloud Computing Benchmarking

Figure 3:
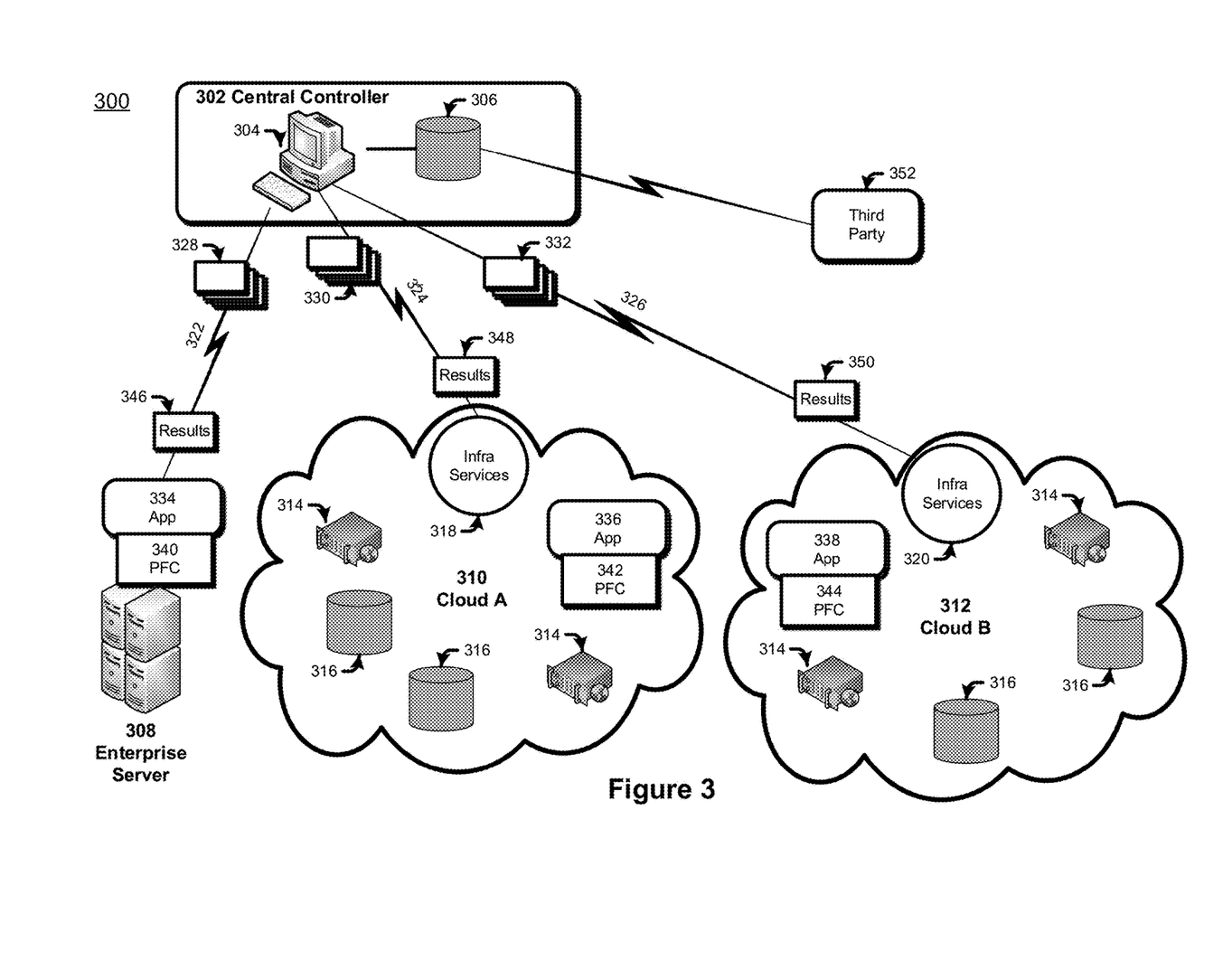
FIG. 3 is a system diagram of an exemplary embodiment for cloud computing benchmarking.
Figure 4:
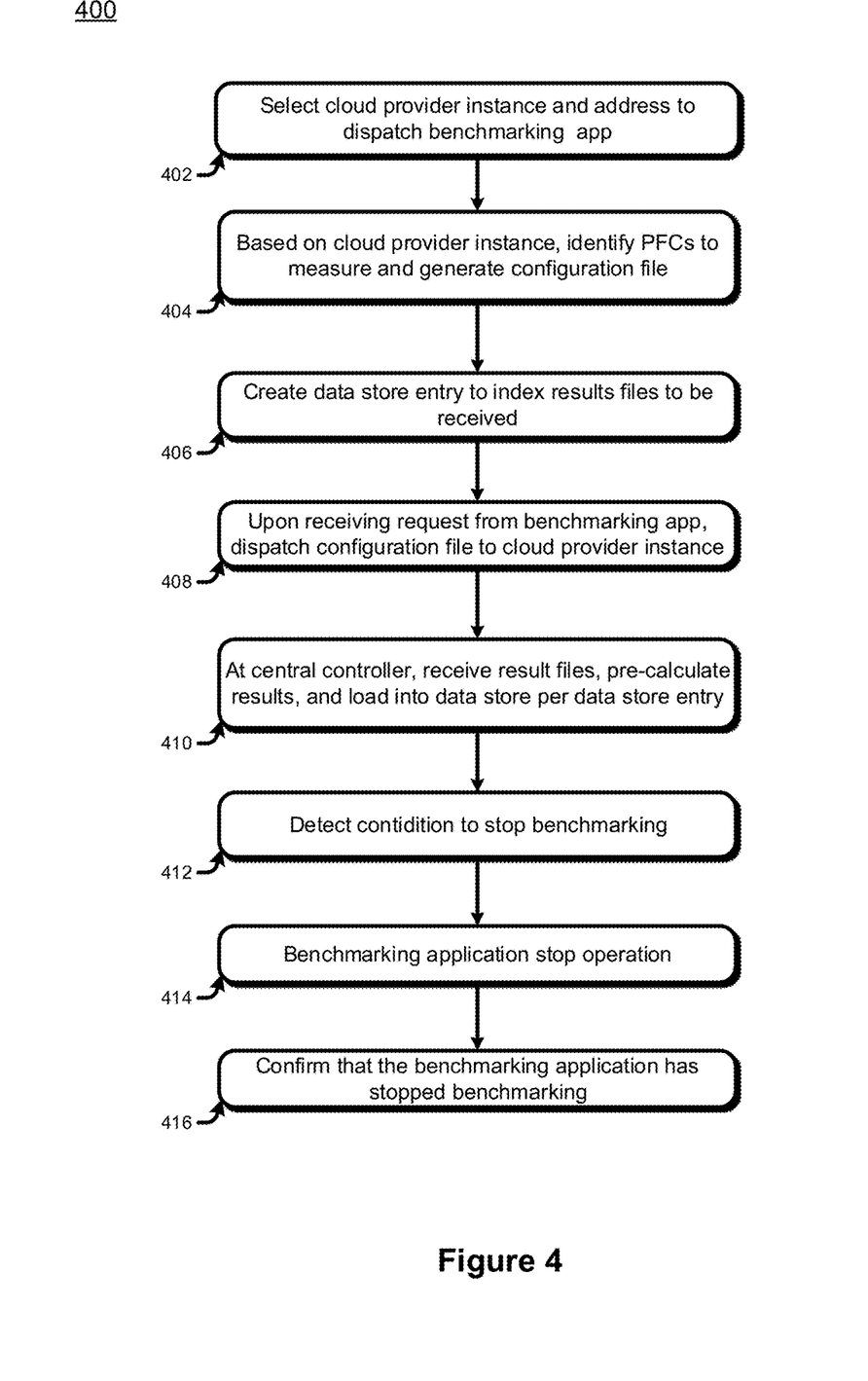
FIG. 4 is a flowchart of an exemplary dispatch operation for cloud computing benchmarking.

FIG. 3 is an exemplary detailed system diagram of the example operation of a cloud computing benchmarking infrastructure 300. FIG. 3 expands on the high level system diagram of FIG. 1. FIG. 4 illustrates a flowchart 400 of the example operation of cloud computing benchmarking infrastructure 300.

Central controller 302 comprises a computer 304 hosting a controller application (not shown) and data store 306. In the present example, central controller 302 is to benchmark enterprise server 308 on a LAN, Cloud A 310 and Cloud B 312.

Clouds A and B 310, 312 may include disaggregated application servers 314 and disaggregated data storage 316 either exposed via a file system or database management system. Cloud A 310 and Cloud B 312 each expose cloud functionality through their respective infrastructure services 318 and 320.

Central controller 302 may communicate with enterprise server 308, Cloud A 310, or Cloud B 312 via communications connections 322, 324, 326 respectively. Over communications connections 322, 324, 326, executables, configuration files, results, commands, and generally arbitrary data 328, 330, 332 may be transmitted and received without loss of generality.

In block 402 of FIG. 4, the central controller 302 will initially select one or more cloud provider instances to benchmark. Upon selection, the central controller 302 identifies the network addresses of the selected cloud provider instances, and dispatches benchmarking applications 334, 336, 338.

While dispatching benchmarking applications 334, 336, 338, in 406 of FIG. 4, the central controller 302 creates data entries in data store 306 to store and/or index anticipated received results from the dispatched benchmarking applications 334, 336, 338.

Upon arrival, benchmarking applications 334, 336, 338 will instantiate. In block 408 of FIG. 4, central controller 302 will dispatch configuration file 340, 342, 344. Specifically, after instantiation, benchmarking applications 334, 336, 338 will first determine whether there is configuration file to load. If no configuration file is available, the benchmarking applications 334, 336, 338 affirmatively poll central controller 302 for a configuration file. Central controller 302 generates configuration files by identifying relevant PFCs for the respective platform. Candidate PFCs are described with respect to Tables 1-7 above.

The configuration file 340, 342, 344 provides for separation data and metadata, which enable versioning. This enables for measurements based on a data point to be collected and tied to a particular version and a particular set of applicable predictive models. For each new version, the benchmarking application 334, 336, 338 may then validate data for backwards compatibility, and adapts the metadata based on usability. At this point the metadata is assigned and maintained by the central controller 102 and serialized such that the configuration file 340, 342, 344 carries the metadata tag through benchmarking operations to ensure that the data sets are collected and stored with the metadata version for tracking, auditability and certification.

The data is also keyed and/or serialized to a given cloud provider instance where its respective benchmarking application 334, 336, 338 is executing, since cloud provider instances are both temporal in location and existence. Several services are activated by benchmarking measurements over time. An example of such a service will be for a cloud provider to use the benchmarking measurements to move workloads between cloud provider instances as to ensure minimize impact to the overall workload. Another example may be the ability to enable hibernation of cloud instances, such as development and test instances, that are only needed sporadically, but may be restarted quickly while ensuring that the restarted instances meet the same benchmarking measurements before. Over time, the benchmarking measurements may enable analyzing service performance trends across interruptions in service, Additionally, tracking metadata and the cloud computing instance, enables cross correlation of benchmarking measurements both within the same cloud provider and between different cloud providers. For example, two very different customers may select a similar application profile comprised of one or more PFCs and/or indicia. Comparison is only possible if the PCFs and/or indicia are of a common specific test methodology and serialized for analysis against consistent benchmarking algorithms.

The benchmarking applications 334, 336, 338 will perform several checks prior to initiating benchmarking. First the benchmarking applications 334, 336, 338 authenticate and validate the configuration files 340, 342, 344 as described previously. The benchmarking applications 334, 336, 338 will then affirmatively poll for a new version from the central controller 302. If there is a new version, then the new version is retrieved. Otherwise, a command indicating that the benchmarking is "permitted to run" is dispatched by the central controller 302. Furthermore, the benchmarking applications 334, 336, 338 will determine if its local environment has sufficient capacity to perform benchmarking. The benchmarking may be in the form of measuring known PFCs. If there is sufficient capacity, then the benchmarking applications 334, 336, 338 may instantiate other executables or scripts (not shown) to aid in benchmarking.

Benchmarking applications 334, 336, 338 then make an initial PFC and time stamp measurement. This initial PFC measurement provides a baseline for comparing future measurements. During the benchmarking cycle, the benchmarking applications 334, 336, 338 may periodically or upon detecting an event take PFC measurements. The measurements are persisted to local storage. When the central controller 302 requests the results, or when a predetermined condition is satisfied, the benchmarking applications 334, 336, 338 transmit at least some of the persisted measurements as results 346, 348, 350 back to central control 302 for storage in data store 306.

In block 410 of FIG. 4, when central controller 302 receives results, it may perform store the raw results, or otherwise perform some precalculations of the raw data prior to storing in data store 306.

Proceeding to block 412 of FIG. 4, benchmarking applications 334, 336, 338 eventually detect a condition to stop benchmarking. One condition is that the benchmarking is complete. Another condition is that the benchmarking applications 334, 336, 338 have lost communications with central controller 302. Yet another condition is the detection that capacity PFCs the local environment benchmarking applications 334, 336, 338 exceed a predetermined threshold. Finally, another condition is the reception of a negative "permit to run" flag or a command from the central controller 302 to cease execution. Upon detecting any of the conditions, in block 414 of FIG. 4, benchmarking applications 334, 336, 338 stop benchmarking. Optionally, in block 416, central control 302 may verify that the benchmarking applications 334, 336, 338 have stopped benchmarking.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system to benchmark infrastructure, comprising:
a processor;
a memory communicatively coupled to the processor;
a benchmarking application that measures and stores one or more benchmark indicia of a cloud provider based at least in part on validating the cloud provider, the one or more benchmark indicia being associated with computing instances of the cloud provider; and
a central controller stored in the memory and operative on the processor, the central controller to:
dispatch, via a network connection between the central controller and the cloud provider, a configuration file and the benchmarking application to a first computing instance of the cloud provider and a second computing instance of the cloud provider, the first computing instance being associated with a secure execution of the benchmarking application and the second computing instance being associated with a non-secure execution of the benchmarking application, wherein the configuration file specifies the one or more benchmark indicia;
detect, prior to execution of the benchmarking application on the first computing instance and the second computing instance, initial measurements of the one or more benchmark indicia on the first computing instance and the second computing instance;
cause the benchmarking application to perform a secure execution on the first computing instance and a non-secure execution on the second computing instance, the benchmarking application to measure corresponding benchmark indicia for the first computing instance and the second computing instance; and
determine a compensation measurement that quantifies a computational latency between the secure execution of the benchmarking application on the first computing instance, the non-secure execution of the benchmarking application on the second computing instance, and the initial measurements of the one or more benchmark indicia.

2. The system of claim 1, wherein the one or more benchmark indicia include one or more scalable indicia.

3. The system of claim 1, wherein the one or more benchmark indicia are a measure of any one of performance, function, or characteristics of the cloud provider.

4. The system of claim 1, wherein the compensation measurement makes use of a statistical model of a behavior of the cloud provider.

5. The system of claim 1, wherein the central controller is further configured to dispatch a second benchmarking application to a second cloud provider, and the second benchmarking application, is configured to execute on the second cloud provider and operative to measure and store one or more benchmark indicia of the second cloud provider, and configured to compensate for at least one resource used by the second benchmarking application in storing the benchmark indicia of the second cloud provider.

6. The system of claim 5, wherein the cloud provider and the second cloud provider have different service abstractions.

7. They system of claim 1, wherein the benchmark indicia are any one of compute indicia, memory indicia, disk indicia, operating system indicia, network indicia, database indicia, or cloud indicia.

8. A method to benchmark a cloud computing instance of a cloud provider, the method comprising:
receiving at a central controller a first address of a first cloud computing instance and a second address of a second cloud computing instance;
dispatching, via a network connection between the central controller and a server executing the first cloud computing instance and the second cloud computing instance, a benchmarking application from the central controller to the first cloud computing instance at the first address and the second cloud computing instance at the second address, the first cloud computing instance being associated with a secure execution of the benchmarking application and the second cloud computing instance being associated with a non-secure execution of the benchmarking application; and
dispatching to the first cloud computing instance and a second cloud computing instance, a configuration file that specifies one or more benchmark indicia to be measured by the benchmarking application, the configuration file including at least a version identifier of the configuration file;
causing the benchmarking application to perform a secure execution on the first cloud computing instance and a non-secure execution on the second cloud computing instance, the benchmarking application to:
validate the configuration file based at least in part on the version identifier;
detect, prior to execution of the benchmarking application on the first cloud computing instance and the second cloud computing instance, initial measurements of the one or more benchmark indicia on the first cloud computing instance and the second cloud computing instance; and
quantify a computational latency between the secure execution of the benchmarking application on the first cloud computing instance, the non-secure execution of the benchmarking application on the second cloud computing instance, and the initial measurements of the one or more benchmark indicia.

9. The method of claim 8, wherein the configuration file is dispatched in response to a request from the benchmarking application for a new version of the configuration file.

10. The method of claim 9, further comprising identifying at least one benchmark indicium of the one or more benchmark indicia to be measured at the central controller based at least on the cloud computing instance, and generating the configuration file at the central controller based on the at least one benchmark indicium.

11. The method of claim 8, further comprising at the central controller, dispatching a command to the benchmarking application, wherein the benchmarking application contains a permit-to-run flag such that the benchmarking application executes if the permit-to-run flag is turned on, and the benchmarking application does not execute if the permit-to-run flag is turned off, and the command from the central controller is a command to toggle the permit-to-run flag between being turned on and turned off.

12. The method of claim 11, further comprising:
receiving, at the central controller, an indication to halt measurement of the one or more benchmark indicia, and wherein, dispatching the command to the benchmarking application includes toggling the permit-to-run flag to off.

13. The method of claim 8, further comprising:
creating at the central controller a data store entry to index results files of the benchmarking application;
receiving, from the benchmarking application, a results file that includes the one or more benchmark indicia; and
storing at the data store entry at the central controller the one or more benchmark indicia from the results file.

14. The method of claim 13, further comprising prior to storing at the data store entry at the central controller the one or more benchmark indicia, performing, at the central controller, pre-calculations associated with the one or more benchmark indicia, based at least in part on the results file.

15. The method of claim 13, further comprises:
associating, by the central controller, the benchmarking application with a metadata tag, and
storing, at the data store entry at the central controller, an association of the one or more benchmark indicia with the metadata tag.

16. The method of claim 13, further comprising:
causing the benchmarking application to encrypt the one or more benchmark indicia.

17. A system to benchmark infrastructure, comprising:
a processor;
a memory communicatively coupled to the processor;
a central controller stored in the memory and operative on the processor, the central controller to:
dispatch a benchmarking application to a first computing instance of a cloud provider and a second computing instance of the cloud provider, the benchmarking application to include a plurality of benchmark indicia, the first computing instance being associated with a secure execution of the benchmarking application and the second computing instance being associated with a non-secure execution of the benchmarking application,
wherein the benchmarking application is configured to measure the plurality of benchmark indicia on the first computing instance and the second computing instance;
detect, prior to execution of the benchmarking application on the first computing instance and the second computing instance, initial measurements of the plurality of benchmark indicia on the first computing instance and the second computing instance;
cause the benchmarking application to perform a secure execution on the first computing instance and a non-secure execution on the second computing instance; and
quantify a computational latency between the secure execution of the benchmarking application on the first computing instance, the non-secure execution of the benchmarking application on the second computing instance, and the initial measurements of the one or more benchmarking indicia;
receive, from the benchmarking application, a results file that includes the computational latency and the plurality of benchmark indicia; and
develop a statistical model based at least in part on the plurality of benchmark indicia, the statistical model to extrapolate a performance measurement for the cloud provider.

18. The system of claim 17, wherein the central controller further comprises a data store and wherein the central controller is further operative on the processor to:
store the results file in the data store.

19. The system of claim 18, wherein the central controller is further operative on the processor to:
perform statistical operations on the results file stored in the data store; and
perform a comparative analysis based at least on the statistical operations.

20. The system of claim 1, wherein the central controller is further configured to:
select performance indicia to measure the one or more benchmark indicia for one or more computing instances on a cloud provider, the performance indicia including at least one compute indicia that is associated with a physical or virtual processor core used by the cloud provider, at least one memory indicia that is associated with a physical or virtual memory used by the cloud provider, and at least one disk indicia that is associated with storage capacity available on the cloud provider.

* * * * *